United States Patent
Ono et al.

(10) Patent No.: US 8,730,411 B2
(45) Date of Patent: May 20, 2014

(54) DISPLAY DEVICE

(75) Inventors: Hiroyuki Ono, Tokyo (JP); Makoto Koizumi, Tokyo (JP); Naoto Sukou, Chiba (JP); Nobuyuki Hara, Kanagawa (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 13/095,524

(22) Filed: Apr. 27, 2011

(65) Prior Publication Data

US 2011/0285925 A1 Nov. 24, 2011

(30) Foreign Application Priority Data

May 19, 2010 (JP) ................................ P2010-115240

(51) Int. Cl.
*H04N 5/64* (2006.01)
(52) U.S. Cl.
USPC ........................................................ 348/836
(58) Field of Classification Search
CPC ..... F16M 11/10; F16M 11/38; F16M 13/022; F16M 5/65
USPC ....................................... 348/836; 349/50–60
See application file for complete search history.

(56) References Cited

U.S. PATENT DOCUMENTS

| | | | | |
|---|---|---|---|---|
| 2007/0008686 A1* | 1/2007 | Jang | ............................ | 361/681 |
| 2007/0216702 A1* | 9/2007 | Takahashi et al. | ............ | 345/582 |
| 2011/0205454 A1* | 8/2011 | Kim et al. | .................... | 348/836 |

FOREIGN PATENT DOCUMENTS

JP 2007-159048 6/2007

* cited by examiner

*Primary Examiner* — William C Vaughn, Jr.
*Assistant Examiner* — Naod Belai
(74) *Attorney, Agent, or Firm* — Finnegan, Henderson, Farabow, Garrett & Dunner, L.L.P.

(57) ABSTRACT

A display device includes:
- a front-face member having a transparent plate, a frame having a joint face joined to a rear face of the transparent plate by a joint layer and a holding face provided upright from the joint face, and a hook projected from the holding face of the frame to the outer periphery side of the transparent plate;
- a display panel which is fit in the frame;
- a sandwiching member having a pair of clipping faces which come into contact with rear and front faces of the display panel, a side face connecting the pair of sandwiching faces, and an opening which is formed in the side face and to which the hook is inserted; and
- a rear-face casing covering the entire rear face of the transparent plate.

7 Claims, 19 Drawing Sheets

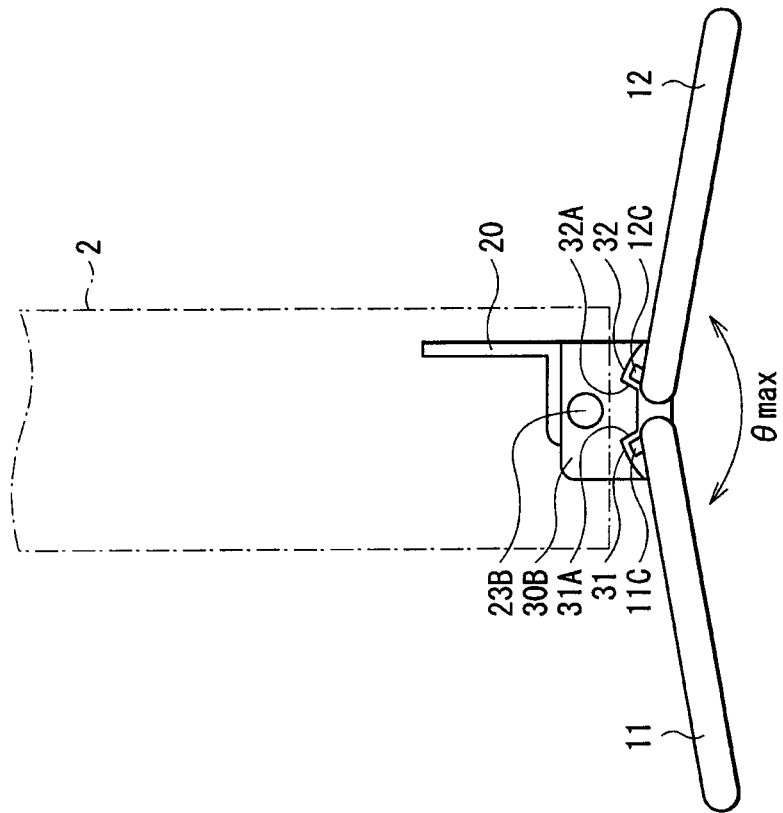
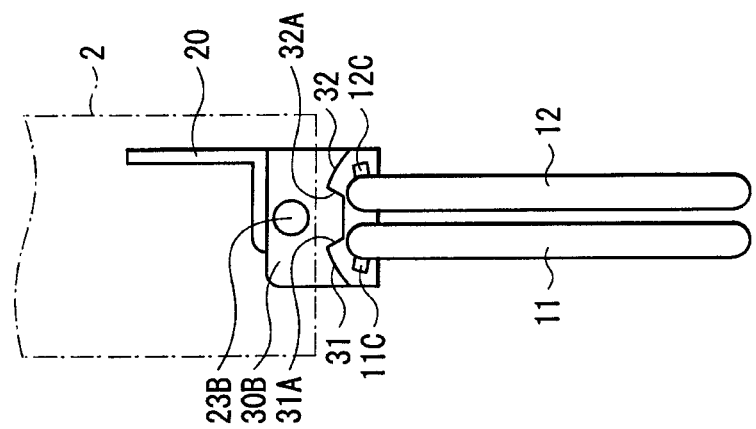
FIG. 11A
FIG. 11B

DISPLAY DEVICE

BACKGROUND OF THE INVENTION

1. Field of the Invention

The present invention relates to a display device suitable for a thin television apparatus or the like.

2. Description of the Related Art

In recent years, a display device for various broadcast waves, video images, and the like is becoming larger and larger and thinner and thinner and is being requested to have a larger picture image display region, a smaller region other than the display region, and a thinner casing. For such a thin display device, it is proposed to provide a transparent glass plate in a front face of a display panel in order to assure the strength of the display panel (see, for example, Japanese Unexamined Patent Application Publication No. 2007-159048).

SUMMARY OF THE INVENTION

However, in such a thin display device in related art, a side-face casing (corresponding to a frame in a normal display device) is screwed to a front-face glass plate, a display panel is held in a frame, and the frame is screwed to a rear-face casing. Consequently, the configuration of the casing is complicated, and a screwing work is necessary in a number of places in an assembling process.

It is therefore desirable to provide a display device with a simplified configuration of a casing and formed with reduced screwing work.

A display device according to an embodiment of the invention includes the following components (A) to (D);
(A) a front-face member having a transparent plate, a frame having a joint face joined to a rear face of the transparent plate by a joint layer and a holding face provided upright from the joint face, and a hook projected from the holding face of the frame to the outer periphery side of the transparent plate,
(B) a display panel which is fit in the frame and has a screw hole in its rear face,
(C) a sandwiching member having a pair of clipping faces which come into contact with rear and front faces of the display panel, a side face connecting the pair of sandwiching faces, an opening which is formed in the side face and to which the hook is inserted, and a through hole which is formed in one of the pair of sandwiching faces and is aligned to the screw hole in the display panel, and
(D) a rear-face casing fixed to the rear face of the display panel by a screw using the through hole and the screw hole and covering the entire rear face of the transparent plate.

In the display device of an embodiment of the invention, the display panel is fit in the frame of the front-face member and is sandwiched by the sandwiching member. When the hook is locked to the side face or the opening in the sandwiching member, the display panel is positioned and temporarily fixed to the front-face member. The sandwiching member has the through hole that is aligned to the screw hole in the display panel, and the rear-face casing is screwed to the rear face of the display panel by using the through hole and the screw hole in the display panel.

In the display device of an embodiment of the invention, the hook is provided for the frame of the front-face member, the display panel which is fit in the frame is sandwiched by the sandwiching member, and the hook is locked to the side face or the opening of the sandwiching member. Consequently, the display panel is positioned and temporarily fixed to the front-face member without using a screw, so that the screwing work is reduced. Since the through hole which is aligned to the screw hole in the display panel is formed in the sandwiching member, the rear-face casing is screwed to the rear face of the display panel using the through hole and the screw hole, and the entire rear face of the transparent plate is covered with the rear-face casing, a side-face casing as used in related art becomes unnecessary, and the configuration of the casing is simplified.

Other and further objects, features and advantages of the invention will appear more fully from the following description.

BRIEF DESCRIPTION OF THE DRAWINGS

FIGS. 11A and 11B are diagrams for explaining the open/close states of front and rear arms illustrated in FIG. 9.

DETAILED DESCRIPTION OF THE PREFERRED EMBODIMENTS

Figure 1:
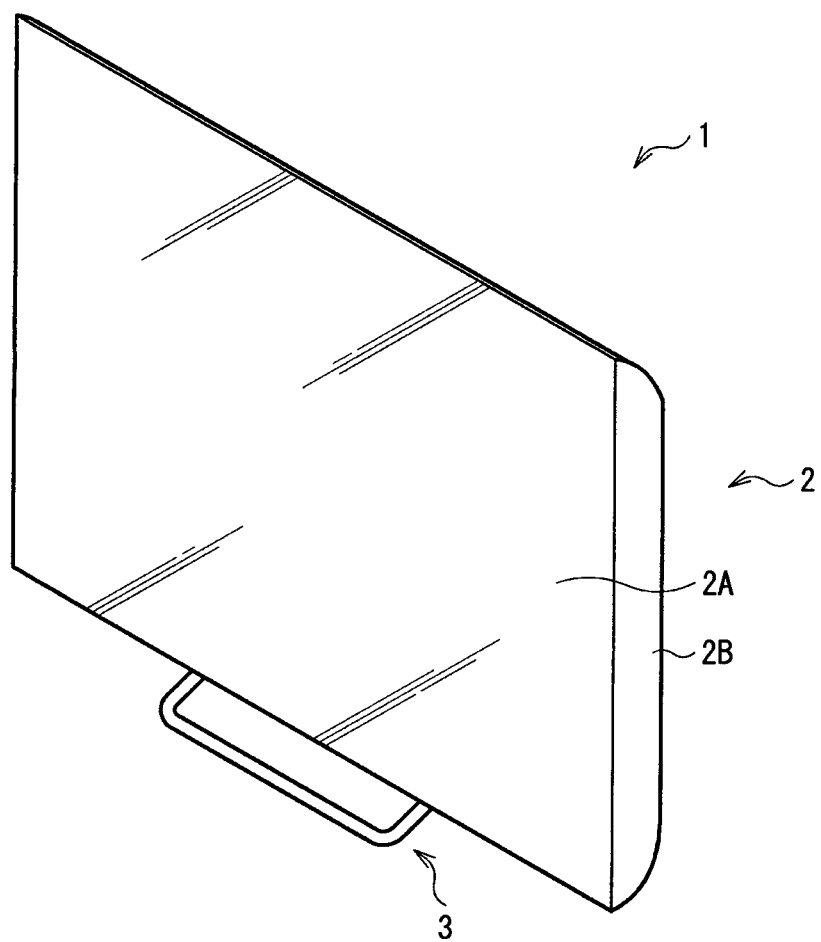
FIG. 1 is a perspective view illustrating the appearance of a display device according to an embodiment of the present invention.

Embodiments of the present invention will be described in detail below with reference to the drawings. The description will be given in the following order.
1. General configuration of display device
2. Configuration of main body
3. Configuration of stand
4. Method of assembling display device
   General Configuration of Display Device FIG. 1 illustrates the appearance of a display device according to an embodiment of the present invention. A display device 1 is used as, for example, a thin-screen television apparatus and has a configuration that a flat-plate-shaped main body 2 for displaying an image is supported by a stand 3. The display device 1 is used as a stationary type by being mounted on a horizontal face such as a floor, a shelf, a table, or the like in a state where the stand 3 is attached to the main body 2. The display device 1 may be also used as a wall-hanging type in a state where the stand 3 is detached from the main body 2.

Configuration of Main Body

The main body 2 is obtained by enclosing a flat-plate-shaped display panel 210 (not illustrated in FIG. 1, refer to FIG. 2) made of liquid crystal or the like between a front-face member 2A made of transparent plate glass or the like and a rear-face casing 2B made of resin or metal. The user can view a picture displayed on the display panel 210 through the front-face member 2A. The display panel 210 is not limited to liquid crystal but may use other display elements such as plasma, organic EL (Electroluminescence), inorganic EL, electrodeposition, electrochromic, and the like.

Figure 2:
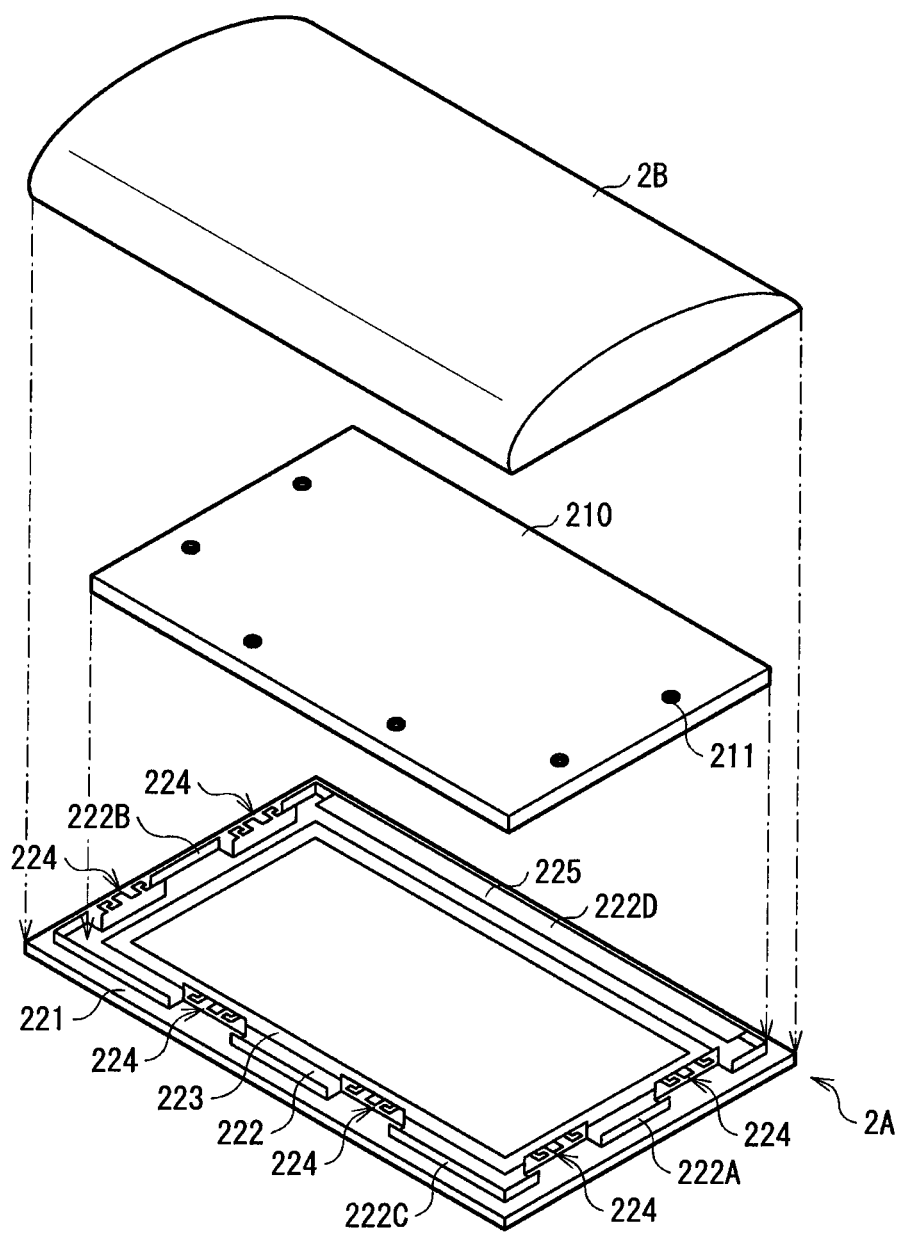
FIG. 2 is an expanded perspective view schematically illustrating the internal configuration of a main body shown in FIG. 1.

FIG. 2 schematically illustrates the internal configuration of the main body 2. The front-face member 2A has a rectangular transparent plate 221 made by plate glass or resin plate to protect the display panel 210, improve the strength, add high-class looking, luster, and the like, and enhance value in design. On the rear face of the transparent plate 221, a rectangular frame 222 formed by a metal thin plate made of iron, stainless steel, or the like is provided along the outer rim of the transparent plate 221, and the display panel 210 is fit in the frame 222. In a peripheral region 2A1 (region in which the frame 222 on the rear face is provided; not illustrated in FIG. 2, refer to FIG. 7) of the transparent plate 221, a colored region (not shown) for hiding internal parts is formed by printing or the like. A part of the peripheral region 2A1 is a transparent region for providing a display illumination area (not shown).

On the inside of the frame 222, a sealing cushion 223 made of felt, nonwoven cloth (Himelon (registered trademark) manufactured by AMBIC Co., Ltd.), or the like is provided. By sealing cushion 223, a slight air layer is provided between the transparent plate 221 and the display panel 210. The air layer has an impact relaxation function and, in addition, functions of assuring a space for inserting a sandwiching member 240 (refer to FIG. 5) which will be described later, suppressing light leakage and reflection by filling the space between the front face of the display panel 210 and the transparent plate 221, and the like. The sealing cushion 223 is not necessarily provided. For example, by providing a step (not illustrated) for attachment to the frame 222 in the outer periphery of the transparent plate 221 and the display panel 210 without providing the sealing cushion 223, the display panel 210 is directly adhered by a double-faced adhesive tape or an adhesive.

In a plurality of places in the frame 222 (for example, in FIG. 2, two places in a right side 222A, two places in a left side 222B, and two places in a lower side 222C), locking parts 224 for positioning and temporarily fixing the display panel 210 to the front-face member 2A by the sandwiching members 240 (refer to FIG. 5) which will be described later are provided. In an upper side 222D of the frame 222, a brim-shaped holding part 225 to which the upper side of the display panel 210 is inserted is provided. It is sufficient that the locking parts 224 are provided for at least three sides of the frame 222, and the number and layout of the locking parts 224 are not limited. For example, the upper side 222D of the frame 222 may be provided with the locking part 224 in place of the brim-shaped holding part 225.

The display panel 210 has, for example, a backlight unit (not shown) on the rear face of the liquid crystal panel (not shown). On the rear face of the backlight unit, a reinforcement plate (not shown) which is a metal thin plate made of aluminum, iron, stainless steel, or the like is provided for assuring strength. The liquid crystal panel has, for example, a liquid crystal layer (not illustrated) between a first substrate (not shown) provided with a TFT (Thin Film Transistor) and a pixel electrode and a second substrate (not shown) provided with an opposed electrode. Screw holes 211 for screwing the rear-face casing 2B with the sandwiching members 240 which will be described later are formed in the right, left, and lower sides of the rear face of the display panel 210. The screw holes 211 are provided in the same positions as those of the locking parts 224 of the frame 222 (for example, in FIG. 2, two places in the right side, two places in the left side, and two places in the lower side).

The rear-face casing 2B is, for example, a cover made of metal or resin covering the entire rear face of the transparent plate 221. In the right, left, and lower sides of the rear-face casing 2B, through holes 231 (not illustrated in FIG. 2, refer to FIG. 7) for fixing the rear-face casing 2B to the display panel 210 by using the sandwiching members 240 which will be described later are formed. The through holes 231 are formed in the same positions as those of the locking parts 224 in the frame 222 (for example, two places in the right side, two places in the left side, and two places in the lower side). The through hole 231 is provided in a recess 232 (not illustrated in FIG. 2, refer to FIG. 7) formed in the rear-face casing 2B, and the recess 232 is hidden by a detachable cover 233 (not illustrated in FIG. 2, refer to FIG. 7).

Figure 3:
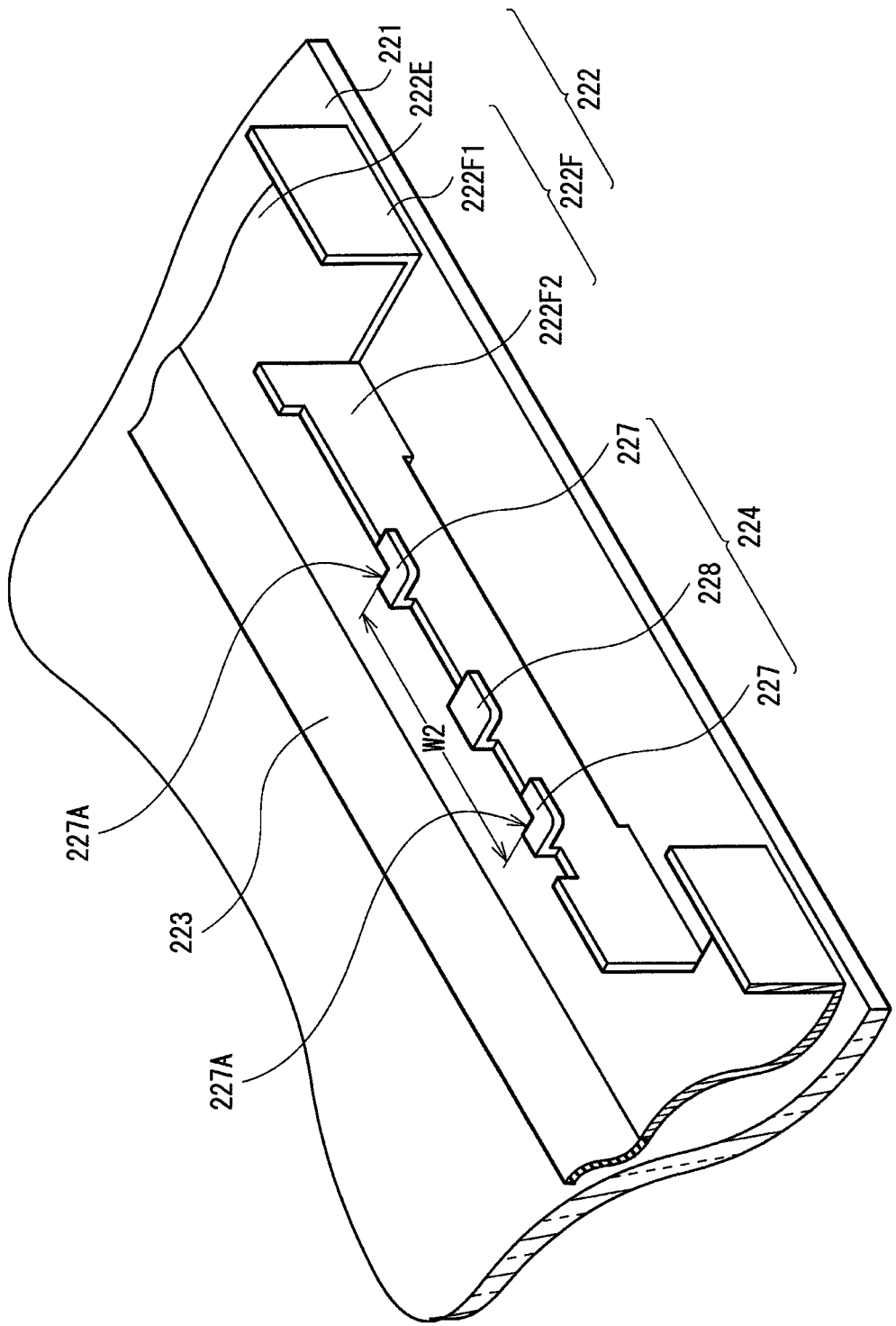
FIG. 3 is an enlarged perspective view of a frame and hooks illustrated in FIG. 2.

FIG. 3 is an enlarged view of the locking parts 224 in the right side 222A of the frame 222. Since the locking parts 224 in the left side 222B and the lower side 222C are similar to those in the right side except for the direction of a hook which will be described later, they will be also described below.

Figure 7:
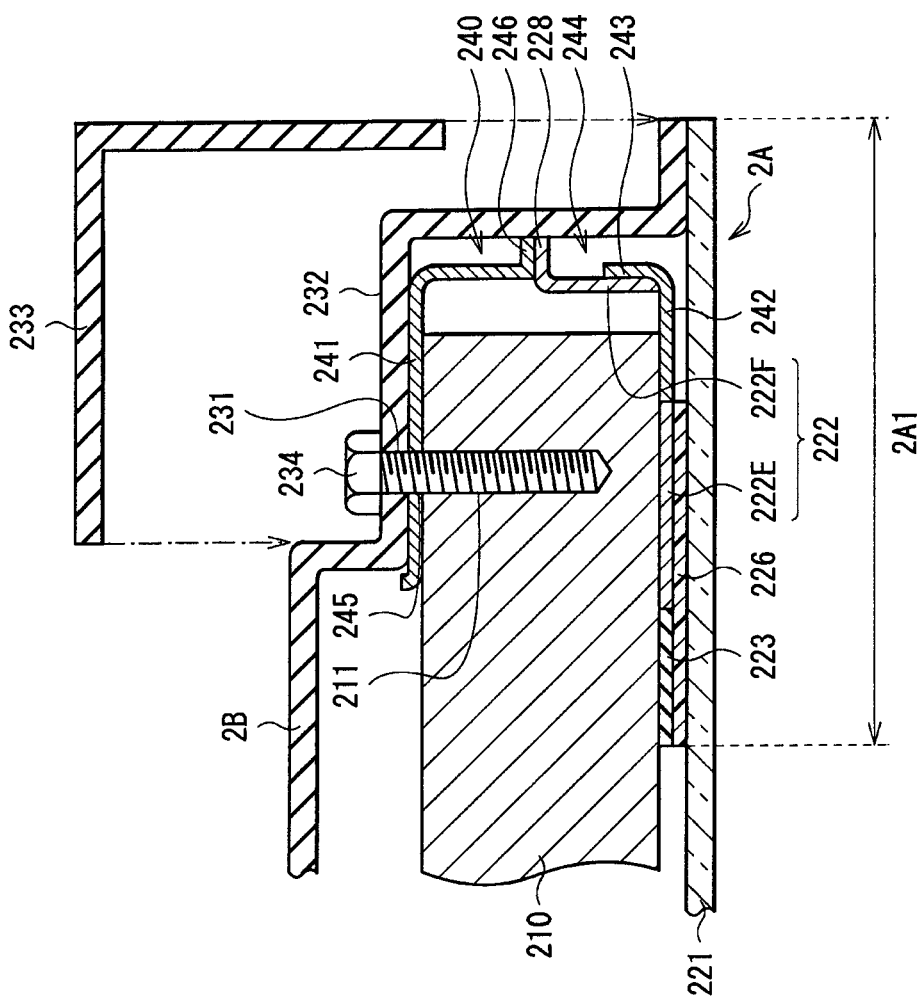
FIG. 7 is a cross section illustrating a configuration taken along line VII-VII of FIG. 6.

The frame 222 has an L-shaped cross section made by a joint face 222E and a holding face 222F which is provided upright from the joint face 222E, and the joint face 222E is adhered to the transparent plate 221 via a joint layer 226 (not illustrated in FIG. 3, refer to FIG. 7). The joint layer 226 is provided by a both-sided adhesive tape, glue, adhesive, or the like between the joint face 222E and the sealing cushion 223 and the above-described colored region (not illustrated). The joint layer 226 may be provided intermittently along the shape of the frame 222 or provided on the entire face.

Figure 4:
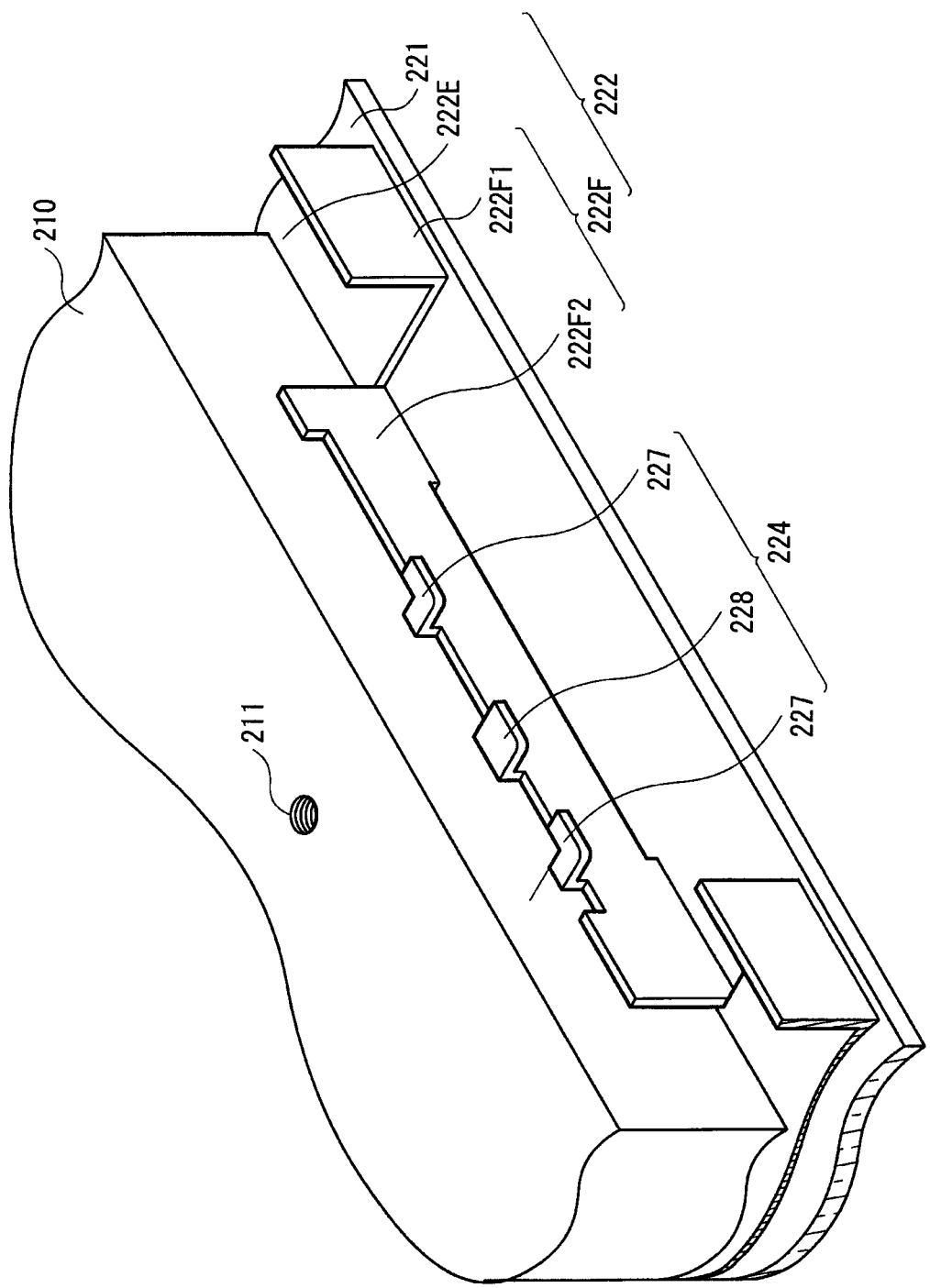
FIG. 4 is a perspective view illustrating a state where a display panel is fit in the frame shown in FIG. 3.

The holding face 222F has an outside part 222F1 near the outer periphery of the transparent plate 221 and an inside part 222F2 receded to the inside from the outside part 222F1, and the locking part 224 is provided for the inside part 222F2. As illustrated in FIG. 4, the display panel 210 is fit in the inside part 222F2 of the frame 222, in the right side 222A, left side 222B, and lower side 222C of the frame 222.

The locking part 224 has a hook 227 projecting from the holding face 222F to the outer periphery side of the transparent plate 221. By the hook 227 and the sandwiching member 240 to be described later, the display panel 210 is positioned and temporarily fixed to the front-face member 2A without using a screw. The hook 227 projects horizontally from the holding face 222F (parallel to the rear face of the transparent plate 221), and its tip bends along the extension direction of the frame 222. Preferably, for example, the hooks 227 of the right side 222A and the left side 222B of the frame 222 bend toward the upper side 222D to prevent the sandwiching member 240 from coming off. The bending direction of the hook 227 of the lower side 222C of the frame 222 is not limited. The hook 227 may bend to the right side 222A or the left side 222B. The hook 227 may be provided in any place in the holding face 222F but is preferably bent, for example, horizontally from the upper periphery of the holding face 222F from the viewpoint of easiness in manufacture.

Figure 5:
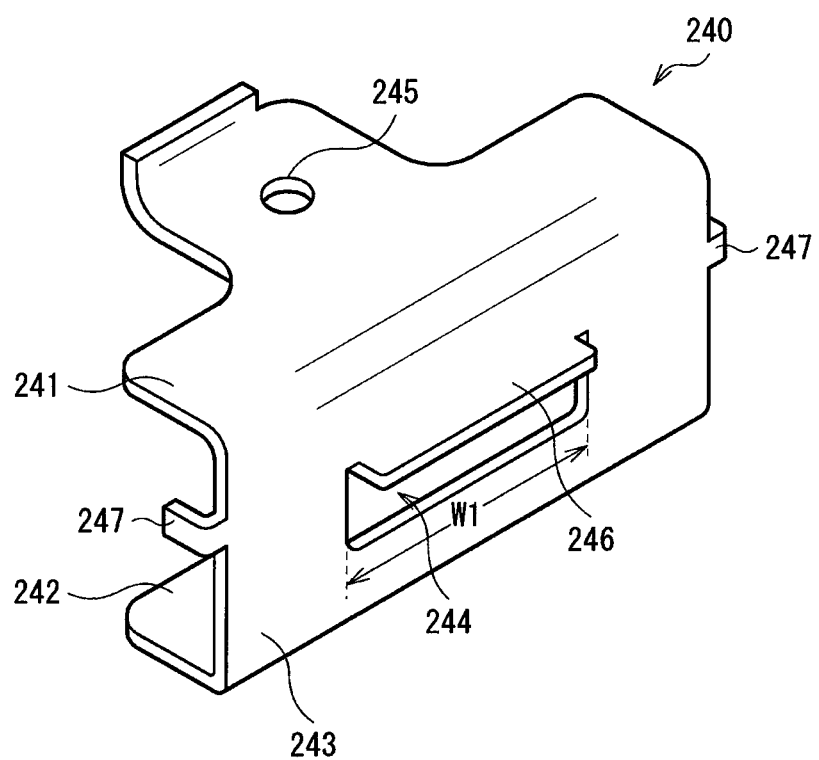
FIG. 5 is a perspective view illustrating the configuration of a sandwiching member.
Figure 6:
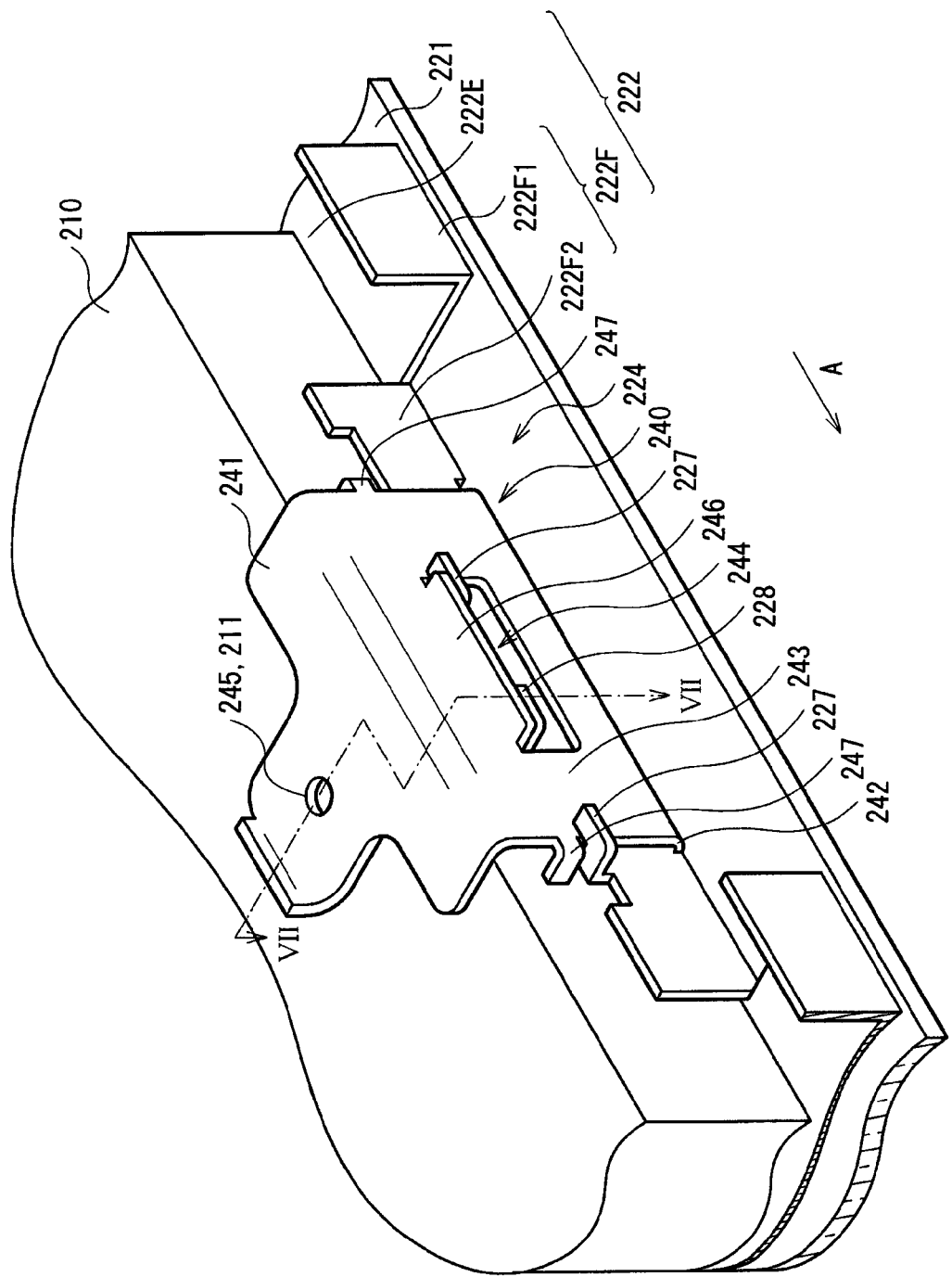
FIG. 6 is a perspective view illustrating a state where the sandwiching member shown in FIG. 5 is used.

FIG. 5 illustrates the configuration of the sandwiching member 240. The sandwiching member 240 has a pair of clipping faces 241 and 242 and a side face 243 connecting the clipping faces 241 and 242. The upper clipping face 241 is in contact with the rear face of the display panel 210, and the lower clipping face 242 is in contact with the front face of the display panel 210. In the side face 243, an opening 244 for passing the hook 227 is formed. As illustrated in FIG. 6, by allowing the hook 227 locked to the opening 244, the display panel 210 is positioned and temporarily fixed to the front-face member 2A. In the upper clipping face 241, a through hole 245 to be aligned to the screw hole 211 in the rear face of the display panel 210 is formed. The through hole 245 is provided to fix the rear-face casing 2B to the rear face of the display panel 210 by a screw 234 as illustrated in FIG. 7. In such a manner, in the display device 1, the configuration of the casing is simplified, and the screw fastening work is reduced.

The sandwiching member 240 is formed by, for example, a thick plate or die cast. A 40-inch-class liquid crystal display device has strength capable of holding the main body 2 of 14 kg to 20 kg. A 52-inch-class liquid crystal display device has strength capable of holding the main body 2 of 30 kg to 36 kg. A 60-inch-class liquid crystal display device has strength capable of holding the main body 2 of about 42 kg.

Preferably, as illustrated in FIG. 7, the sandwiching member 240 has, in its side face 243, a projection 246 which is in contact with the inner face of the rear-face casing 2B to make the rear-face casing 2B easily positioned. To be concrete, preferably, the projection 246 is bent in a brim shape at the upper periphery of the opening 244. Further, preferably, spacers 247 which come into contact with the side face of the display panel 210 are provided on both sides of the side face 243 of the sandwiching member 240. With the configuration, positioning of the rear-face casing 2B is further facilitated.

Preferably, for example, two hooks 227 illustrated in FIG. 3 are provided per locking part 224, and width W1 of the opening 244 in the sandwiching member 240 is equal to distance W2 between the locking faces 227A of the two hooks 227. As illustrated in FIG. 6, by making one of the hooks 227 locked to the opening 244 in the sandwiching member 240 and making the other hook 227 locked to the side face 243 of the sandwiching member 240, drop of the sandwiching member 240 is suppressed with reliability.

A projection piece 228 which projects horizontally from the holding face 222F of the frame 222 toward the outer peripheral side of the transparent plate 221 is provided between the two hooks 227. When the pair of clipping faces 241 and 242 come into contact with the rear and front faces of the display panel 210, as illustrated in FIG. 6, the hook 227 and the projection piece 228 overlap the projection 246. With the configuration, the sandwiching member 240 is supported by the projection piece 228 and stability of the position in the height direction (the direction between the clipping faces 241 and 242) of the sandwiching member 240 is increased.

Configuration of Stand

Figure 8:
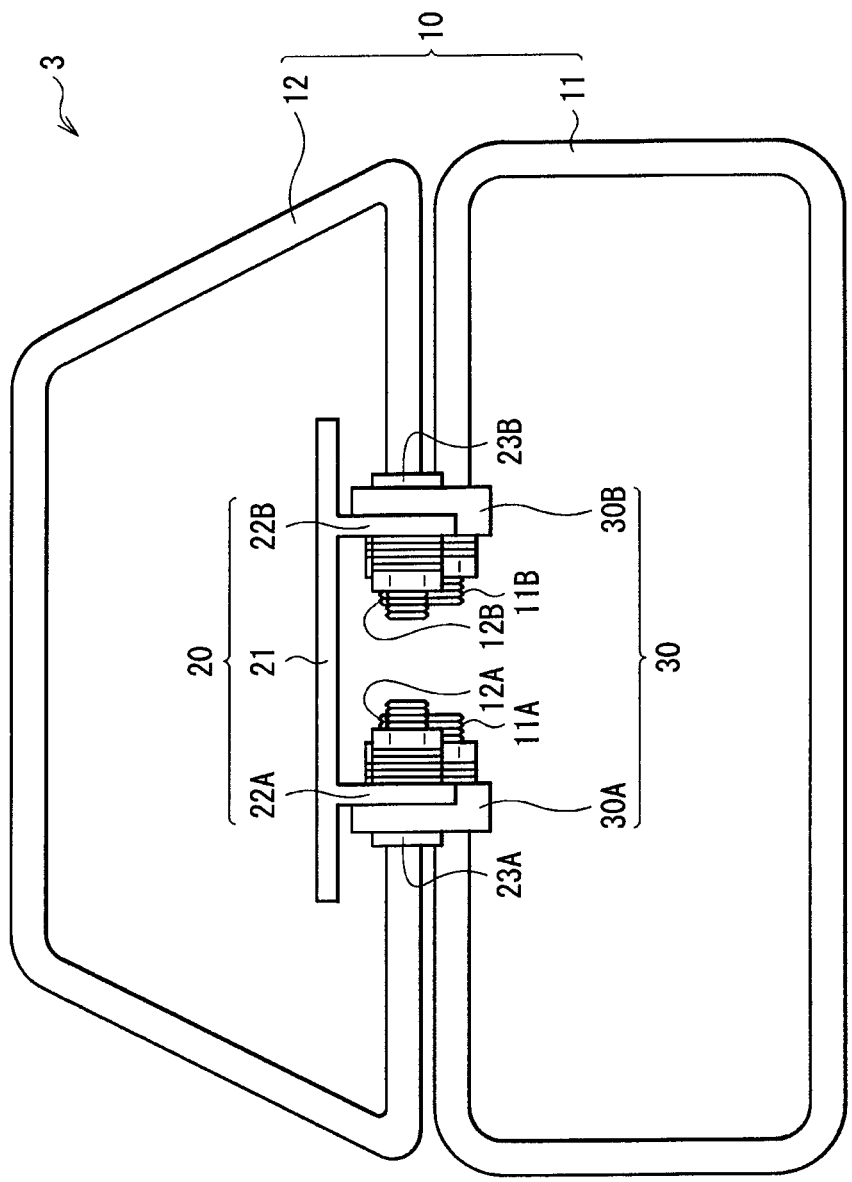
FIG. 8 is a plan view illustrating a general configuration of a stand shown in FIG. 1.
Figure 9:
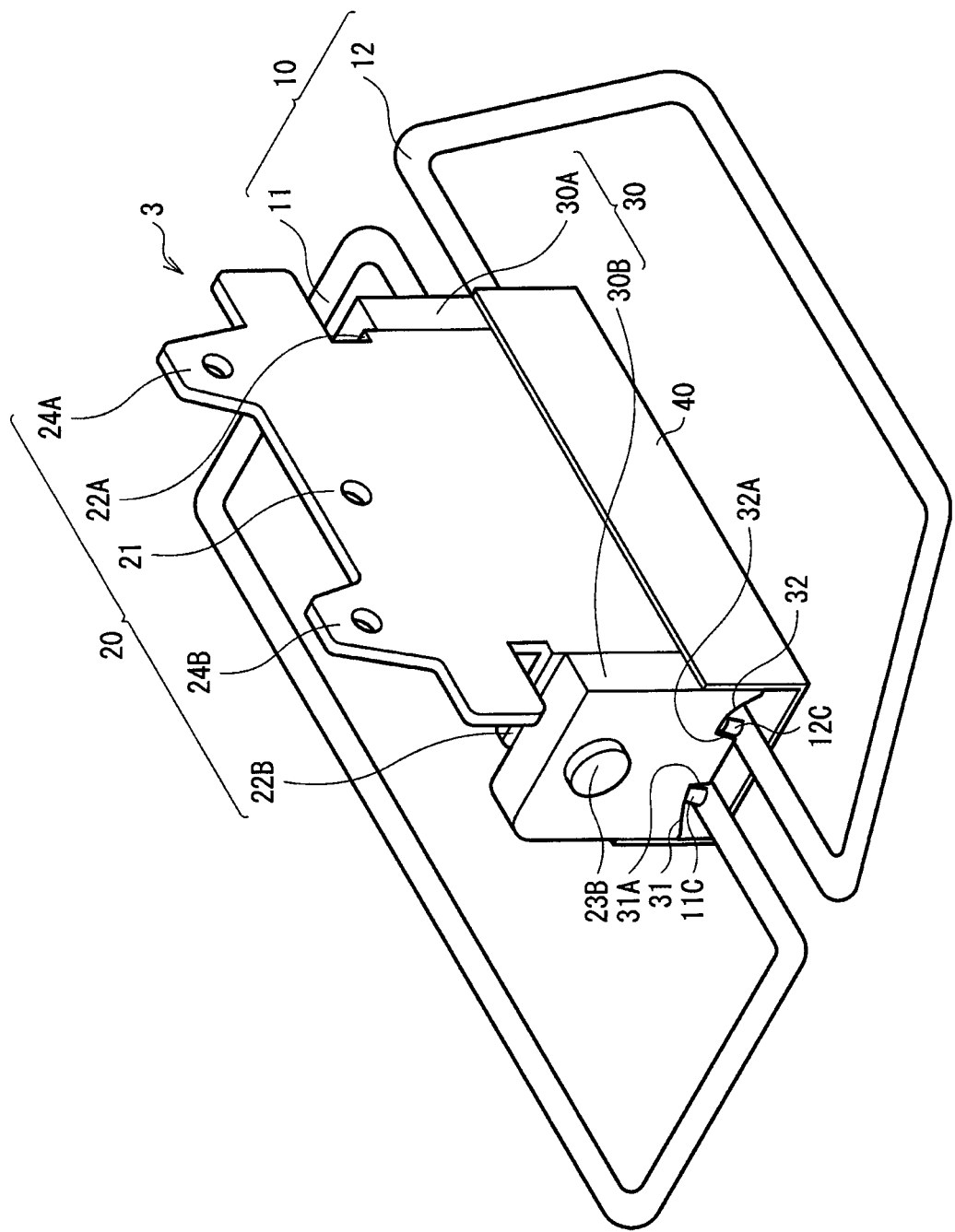
FIG. 9 is a perspective view illustrating the configuration of the stand seen from the rear side.

FIG. 8 illustrates the general configuration when the stand 3 is viewed from above, and FIG. 9 illustrates the general configuration when the stand 3 is viewed from the rear-face side. The stand 3 has a configuration that a base 10 mounted on the installation position of the display device 1 and a bracket 20 supporting the main body 2 as an object to be supported are coupled and integrated by a hinge unit 30. A lower part of the hinge unit 30 is covered with a cover 40 as necessary.

The base 10 has a front arm 11 and a rear arm 12. The front arm 11 is obtained by making a round bar made of metal such as stainless steel having screw parts 11A and 11B at both ends bent in, for example, a rectangular shape so that the both ends face each other. The rear arm 12 is obtained by making a round bar made of metal such as stainless steel having screw parts 12A and 12B at both ends bent in, for example, a trapezoidal shape so that the both ends face each other. The front arm 11 and the rear arm 12 are arranged so that the screw parts 11A and 12A at one end are adjacent to each other and the screw parts 11B and 12B at the other end are adjacent to each other. As for the rods constructing the front arm 11 and the rear arm 12, it is sufficient that at least the screw parts 11A, 11B, 12A, and 12B are round bars. The sectional shapes of the parts other than the screw parts 11A, 11B, 12A, and 12B are not limited to round but may be polygonal shape. The bent shapes of the front arm 11 and the rear arm 12 are not limited to the rectangular shapes such as oblong shape and trapezoidal shape. The front arm 11 and the rear arm 12 may be bent in the same shape.

Figure 10:
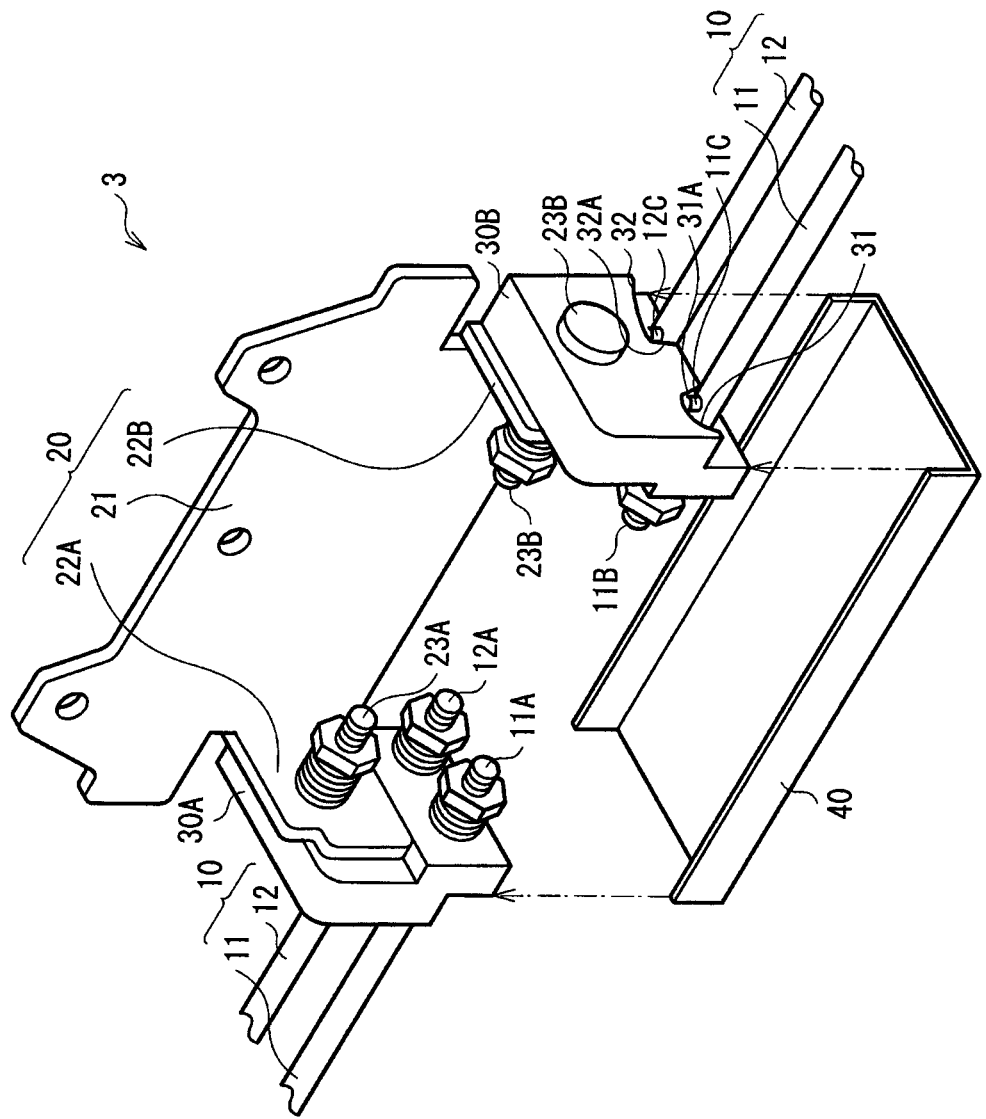
FIG. 10 is an enlarged perspective view of a hinge unit and a bracket illustrated in FIG. 8.

FIG. 10 illustrates the configuration of the hinge unit 30 and the bracket 20 viewed from the front face side. The hinge unit 30 has the function of a hinge for opening/closing the front arm 11 and the rear arm 12 and has two coupling members 30A and 30B. The coupling members 30A and 30B are formed by, for example, a die cast made of aluminum (Al). Each of the coupling members 30A and 30B has total three through holes; two through holes in a lower part, and one through hole in an upper part. In the two through holes in the lower part of the coupling member 30A, the screw parts 11A and 12A at one end of the front arm 11 and the rear arm 12 are spiral-movably fastened. In the two through holes in the lower part of the coupling member 30B, the screw parts 11B and 12B at the other end of the front arm 11 and the rear arm 12 are spiral-movably fastened. Concretely, the screw parts 11A, 11B, 12A, and 12B of the front arm 11 and the rear arm 12 are inserted in the through holes 30A and 30B in a state where a thrust washer (not illustrated), a spring (not illustrated), or the like is stacked to apply lateral pressure to make the screw parts spirally movable. With the configuration, in the stand 3, as illustrated in FIG. 11, the front arm 11 and the rear arm 12 swing around the coupling members 30A and 30B as axes so that the arms are open/close.

The bracket 20 illustrated in FIG. 10 has an attachment part 21 to be fixed to the main body 2 as an object to be supported and is fixed to the coupling members 30A and 30B. With the configuration, in the stand 3, as illustrated in FIG. 11, the front arm 11 and the rear arm 12 are similarly allowed to be open/close without detaching the stand 3 from the main body 2 as an object to be supported. In an attachment part 21, screw holes for fixing the main body 2 are properly formed. Ear pieces 22A and 22B bent from the attachment part 21 at 90 degrees are provided at both ends of the attachment part 21. The ear piece 22A is fixed to the coupling member 30A, and the ear piece 22B is fixed to the coupling member 30B.

The above will be summarized as follows. In the stand 3, the front arm 11 and the rear arm 12 each obtained by bending a bar serve as the base 10, and the screw parts 11A, 11B, 12A, and 12B at both ends of the front arm 11 and the rear arm 12 are fastened spirally and movably in the through holes in the coupling members 30A and 30B. The main body 2 as an object to be supported is fixed to the attachment part 21 of the bracket 20, and the bracket 20 is fixed to the coupling members 30A and 30B. With the configuration, in the stand 3 and the display device 1 having the stand 3, the volume of a packing box is suppressed, and the installing work is simplified.

Figure 12:
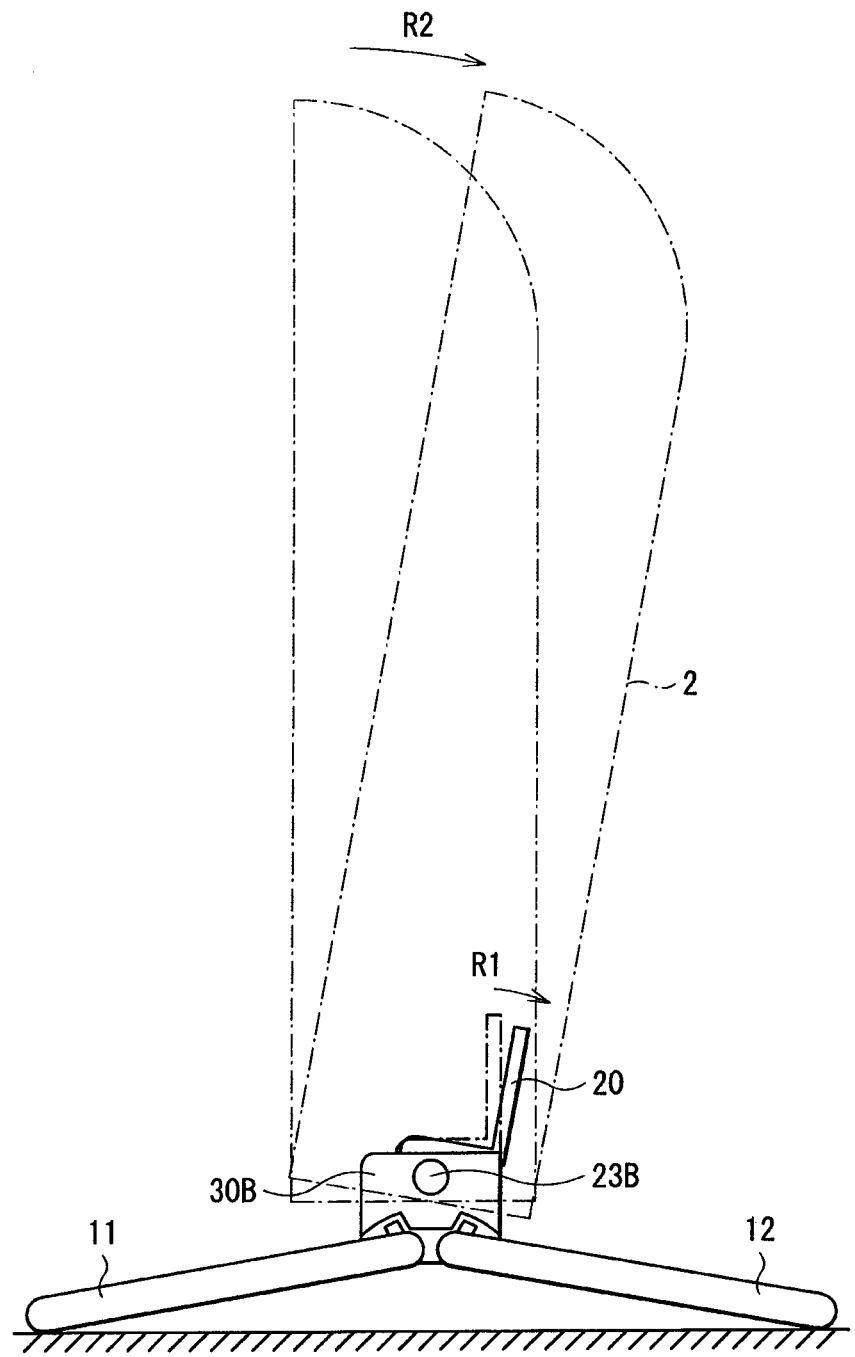
FIG. 12 is a diagram for explaining a change in the installation angle of the main body.

Preferably, the bracket 20 illustrated in FIG. 10 is swingably attached to the two coupling members 30A and 30B. Concretely, the ear pieces 22A and 22B of the bracket 20 are swingably inserted in the through holes in the upper part of the coupling members 30A and 30B by screws 23A and 23B and the thrust washer (not shown). With the configuration, as illustrated in FIG. 12, in association with swing R1 of the bracket 20 by the thrust washer, the main body 2 fixed to the attachment part 21 is inclined to the arrow R2 direction to change the installation angle of the main body 2 by about five degrees in the front/rear direction. The main body 2 may be moved at a slight inclination angle by providing the screws fixing the bracket 20 with a click mechanism (not illustrated) or the like.

As illustrated in FIGS. 11A and 11B, the stand 3 has, as a rotation regulating structure, projections 11C and 12C near the positions of fixation to the coupling members 30A and 30B of the front arm 11 and the rear arm 12 and has grooves 31 and 32 in the outside faces of the coupling members 30A and 30B. The projections 11C and 12C move in the grooves 31 and 32 with opening/closing of the front arm 11 and the rear arm 12. When the front arm 11 and the rear arm 12 are opened at maximum, the projections 11C and 12C come into contact with deepest faces 31A and 32A of the grooves 31 and 32, respectively. In such a manner, the maximum open angle θmax to the installation floor face of the front arm 11 and the rear arm 12 is restricted, and the weight of the main body 2 is supported reliably. The maximum open angle θmax of the front arm 11 and the rear arm 12 is not limited and may be 180° or less as illustrated in FIG. 11B.

The display device 1 is assembled in the following manner as an example.

Assembly of Main Body 2

First, as illustrated in FIG. 2, the display panel 210 is fit in the frame 222 on the rear face of the transparent plate 221 of the front-face member 2A. At this time, the upper side of the display panel 210 is inserted in the brim-shaped holding part 225 on the upper side 222D of the frame 222 and, after that, the right, left, and lower sides of the display panel 210 are fit in the inside part 222F2 of the frame 222 as illustrated in FIG. 4.

Subsequently, the hook 227 of the locking part 224 is inserted in the opening 244 in the sandwiching member 240 illustrated in FIG. 5, and the rear face and the front face of the display panel 210 are sandwiched by the pair of clipping faces 241 and 242.

By making the sandwiching member 240 slide in the direction (the arrow A direction in FIG. 6) opposite to the bending direction of the hook 227, one of the hooks 227 is locked to the opening 244 in the side face 243 of the sandwiching member 240, and the side face 243 of the sandwiching member 240 is locked to the other hook 227. As a result, the display panel 210 is positioned and temporarily fixed to the front-face member 2A without using screws, so that the screw fastening work is reduced. Simultaneously, the through hole 245 formed in the clipping face 241 is aligned to the screw hole 211 in the display panel 210. At the temporary fixing stage, without performing a fastening process such as screwing, an image may be confirmed and adjustments (such as γ adjustment and color adjustment) may be also performed.

After that, as illustrated in FIGS. 2 and 7, the rear-face casing 2B is put on the entire rear face of the transparent plate 221. Using the through hole 245 in the sandwiching member 240 and the screw hole 211 in the rear face of the display panel 210, the rear-face casing 2B is fixed to the rear face of the display panel 210 by the screw 234. As a result, the front-face member 2A, the display panel 210, and the rear-face casing 2B are firmly fixed and integrated, thereby forming the main body 2 illustrated in FIGS. 1 and 2.

Attachment of Stand 3

After formation of the main body 2, the main body 2 is attached to the stand 3. First, as illustrated in 13, the front arm 11 and the rear arm 12 are opened, the stand 3 is mounted on the installation floor surface (not illustrated), and the main body 2 as an object to be supported is allowed to descend from above the stand 3 along the bracket 20.

In the rear-face casing 2B of the main body 2, a recessed part 2C having a proper shape is formed to house the bracket 20 and the coupling members 30A and 30B. In the recessed part 2C, for example, four hooks 2D to be locked to the upper side of the attachment part 21 of the bracket 20 are provided. Preferably, the four hooks 2D are provided in positions to be locked on both sides of two projected parts 24A and 24B at the upper side of the attachment part 21 for positioning and preventing dropout.

Figure 14:
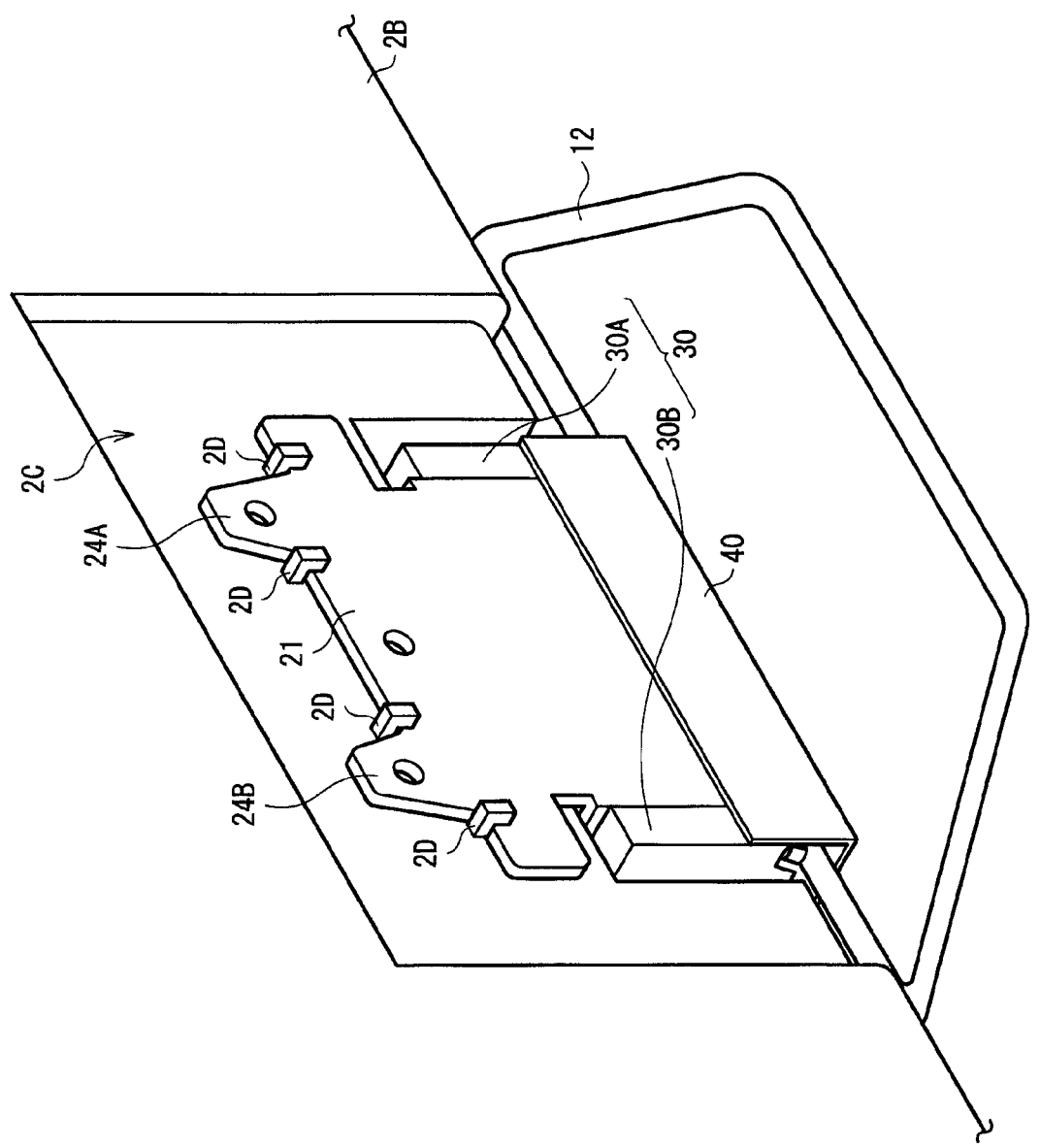
FIG. 14 is a perspective view illustrating a procedure of assembling the display device shown in FIG. 1.
Figure 15:
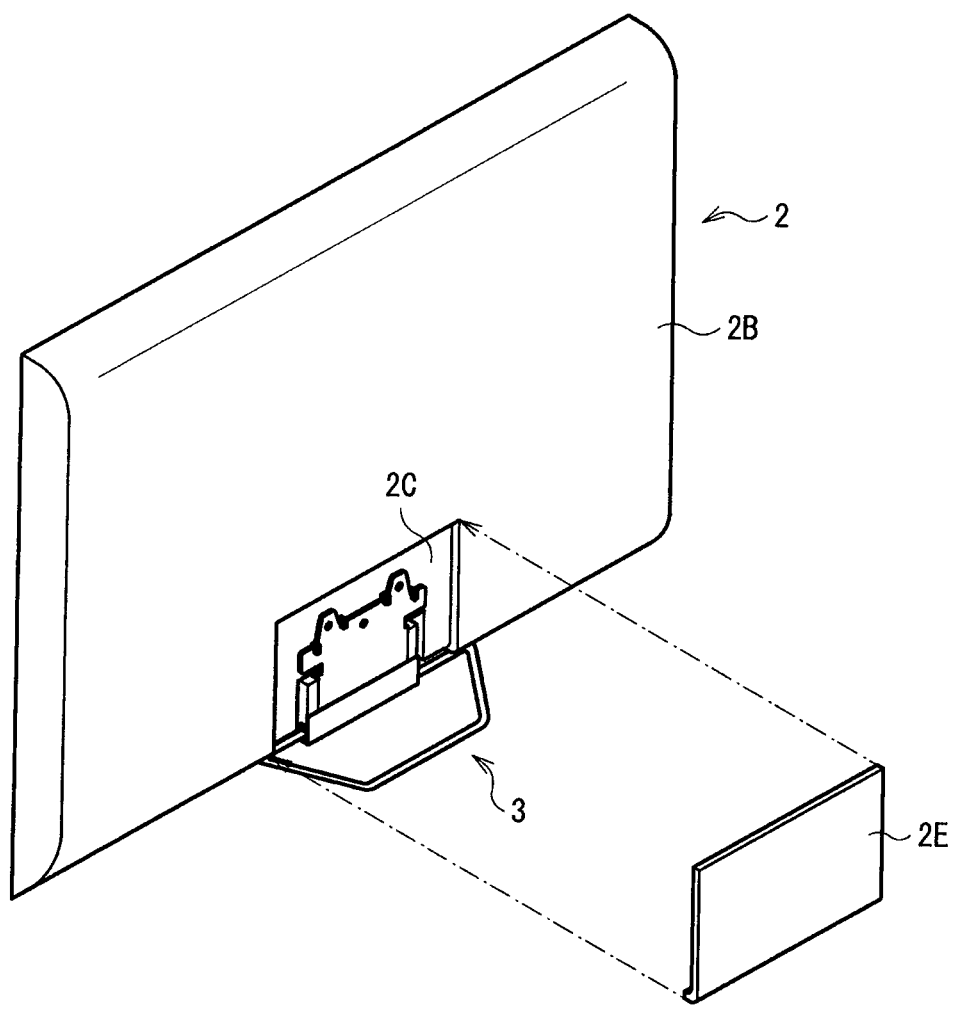
FIG. 15 is a perspective view illustrating a procedure subsequent to FIG. 14.

Subsequently, as illustrated in FIG. 14, the hooks 2D are locked to the upper side of the attachment part 21. Consequently, the main body 2 is attached to the attachment part 21 reliably with a simple work. By making the hooks 2D locked on both sides of the projections 24A and 24B, positioning of the main body 2 is facilitated, and deviation and drop-off of the main body 2 is also suppressed. As necessary, the attachment part 21 may be fixed to the rear-face casing 2B by a screw using the screw hole in the attachment part 21. After that, as illustrated in FIG. 15, the recessed part 2C is closed with a cover 2E. In such a manner, assembly of the display device 1 illustrated in FIG. 1 is completed.

Figure 13:
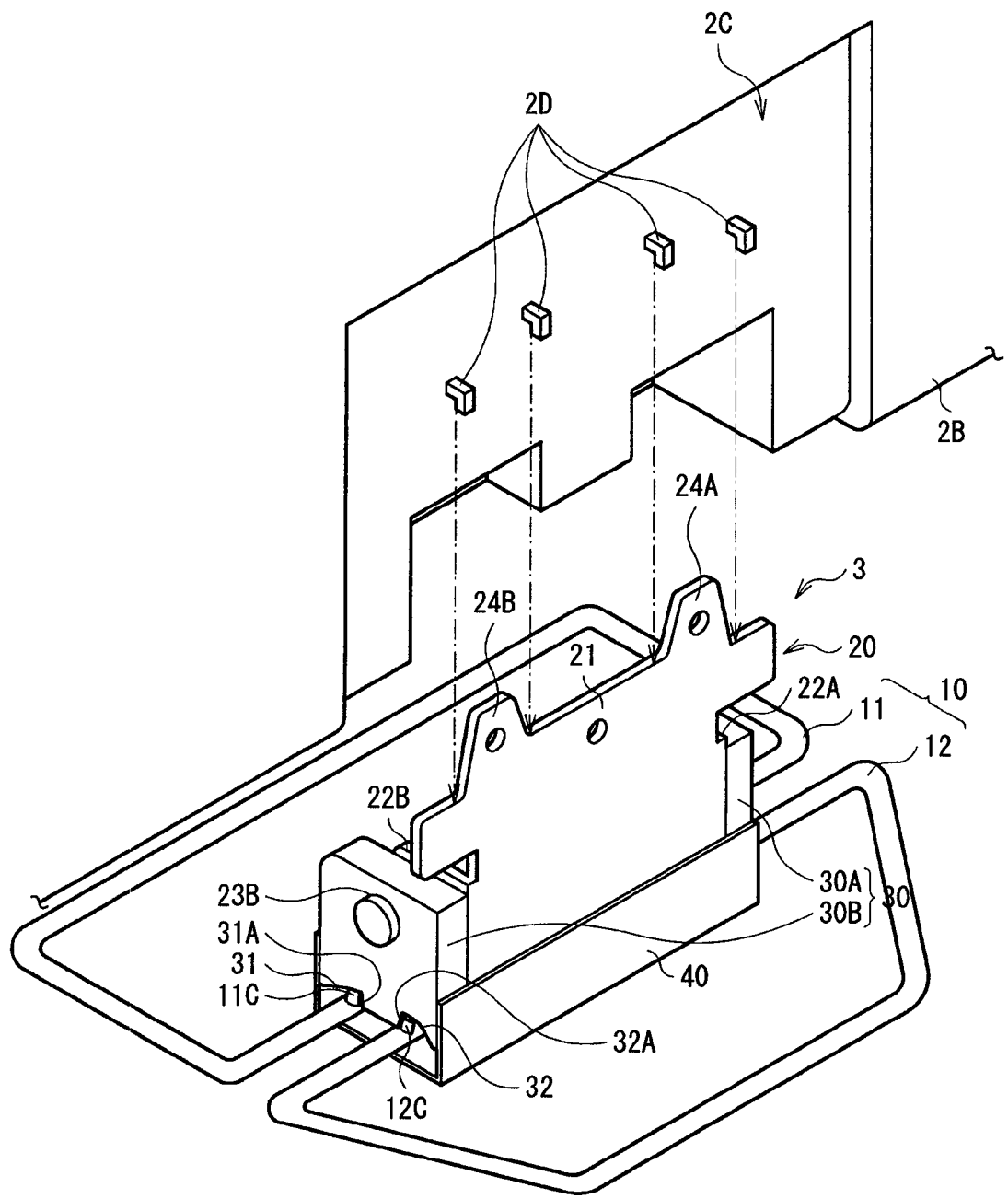
FIG. 13 is a partly exploded perspective view of the display device illustrated in FIG. 1, which is seen from the rear side.

The display device 1 may be disposed in the following manner as an example (detachment of the stand 3). First, as illustrated in FIG. 15, the cover 2E for the recessed part 2C in the rear-face casing 2B is detached. In the case where the attachment part 21 is fixed to the rear-face casing 2B by a screw, the screw is detached. Subsequently, as illustrated in FIGS. 14 and 13, the main body 2 is moved upward to detach the hooks 2D from the upper side of the attachment part 21, thereby enabling the main body 2 to be separated from the attachment part 21 with a simple work. The recessed part 2C is closed with the cover 2E in the separated main body 2, so that application as a wall-hanging display device is realized with a simple work, and convenience for the users improves.

The display device 1 is packed and installed in the following manner as an example.

Figure 16:
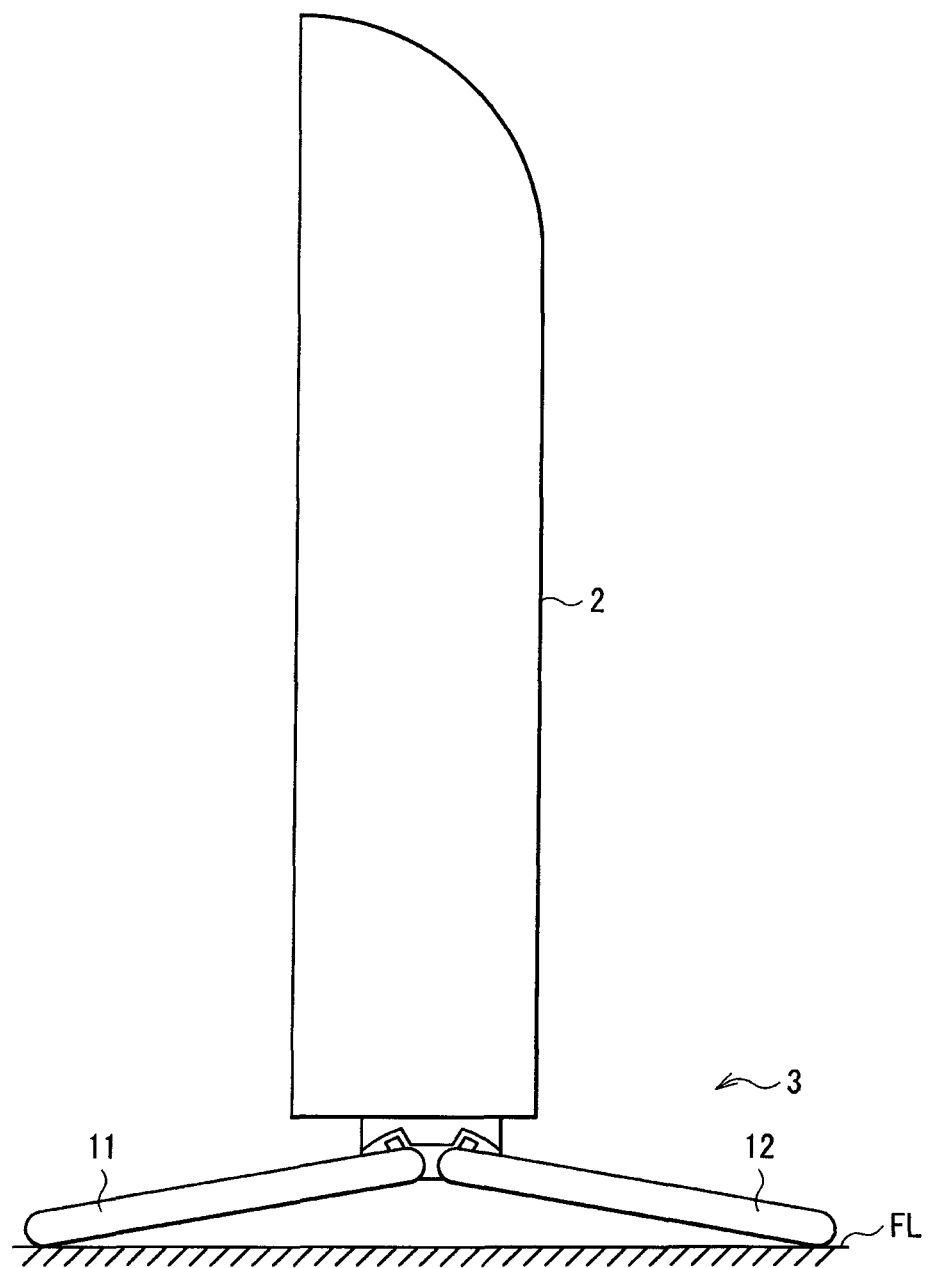
FIG. 16 is a side view illustrating an installation state of the display device shown in FIG. 1.
Figure 17:
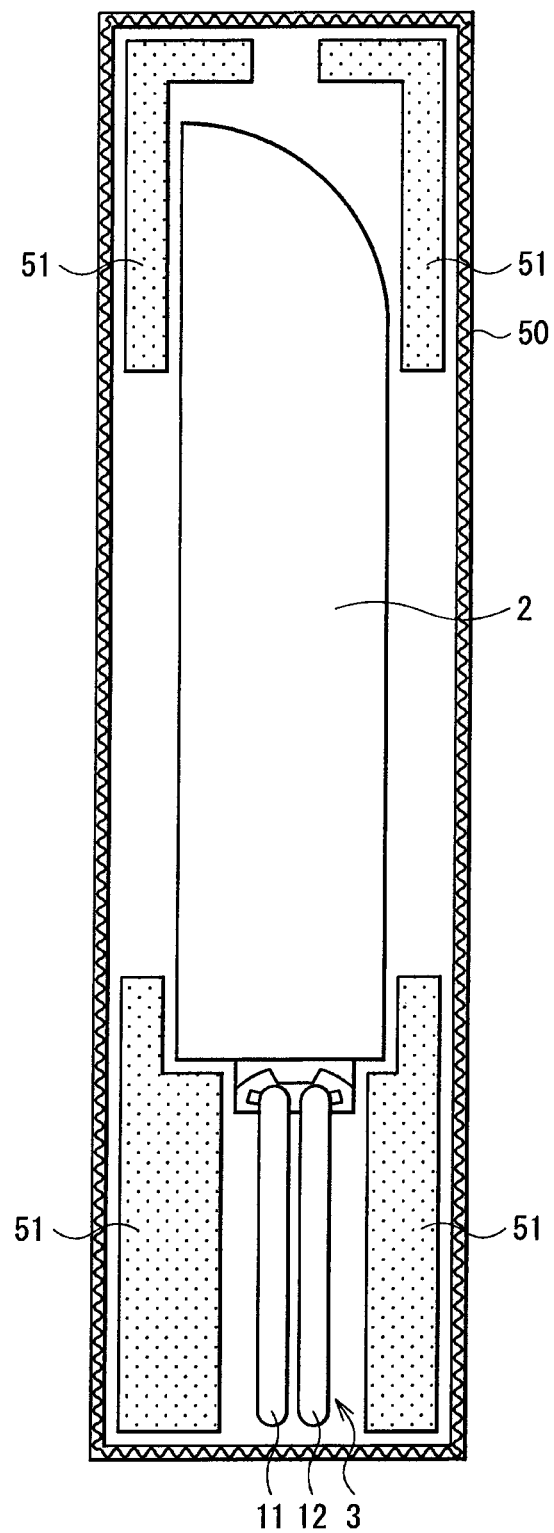
FIG. 17 is a side view illustrating an example of a packing state of the display device.

As illustrated in FIG. 16, the display device 1 is installed on the floor face FL in a state where the front arm 11 and the rear arm 12 are open. Since the main body 2 is fixed to the attachment part 21 of the bracket 20 and both ends of the attachment part 21 are fixed to the coupling members 30A and 30B, the front arm 11 and the rear arm 12 are opened/closed without detaching the stand 3 from the main body 2. Therefore, as illustrated in FIG. 17, in a state where the stand 3 remains attached to the main body 2, the display device 1 is packed in a packing box 50 in a state where the front arm 11 and the rear arm 12 are closed. Consequently, the occupation ratio of a cushion 51 (air area) for maintaining transport strength is decreased by 20% to 30%, and the volume of the packing box 50 is suppressed.

At the time of installation, the package is opened, and the main body 2 and the stand 3 are taken out. By opening the front arm 11 and the rear arm 12 as illustrated in FIG. 16, the display device 1 is immediately installed without necessity of performing complicated assembling work.

In contrast, in related art, a stand obtained by making a pillar stood on a bottom plate having a flat plate shape is used. In the case of packing a display device by detaching the stand from the main body and decomposing the stand to the bottom plate and the pillar, the volume of a packing box becomes large to protect the main body by cushion or the like. It causes deterioration in the transport efficiency (increase in cost). At the time of installation, a complicated assembly work is necessary, and the assembly man-hours (labor charge) is long.

As described above, in the embodiment, the hooks 227 are provided for the frame 222 of the front-face member 2A, the display panel 210 which is fit in the frame 222 is sandwiched by the sandwiching member 240, and the hooks 227 are locked by the side face 243 or the opening 244 of the sandwiching member 240. Consequently, the display panel 210 is positioned and temporarily fixed in the front-face member 2A without using a screw, and the screw fastening work is reduced. By giving sufficient strength to the sandwiching member 240, the invention is applied not only to a small-sized display device of a small portable device, a photoframe, or the like but is also suitably applied to a large-sized display device of 40-inch or 60-inch class.

Further, the through hole 245 which is aligned to the screw hole 211 in the display panel 210 is provided in the sandwiching member 240, the rear-face casing 2B is fixed to the rear face of the display panel 210 by a screw by the through holes 245 and the screw hole 211, and the entire rear face of the transparent plate 221 is covered with the rear-face casing 2B. Consequently, the side-face casing as used in related art becomes unnecessary, and the exterior parts of the display device 1 are constructed only by the front-face member 2A and the rear-face casing 2B. Therefore, the configuration of the casing is simplified and the front-face member 2A, the display panel 210, and the rear-face casing 2B are firmly fixed and integrated by the extremely simple configuration or process.

Further, the side face 243 of the sandwiching member 240 is provided with the projection 246 which comes into contact with the inner face of the rear-face casing 2B, so that the rear-face casing 2B is easily positioned.

With respect to the stand 3, using the front arm 11 and the rear arm 12 each obtained by making a round bar bent as the base 10, the screw parts 11A, 11B, 12A, and 12B at both ends of the front arm 11 and the rear arm 12 are spirally movably fit in the through holes in the coupling members 30A and 30B. Consequently, the front arm 11 and the rear arm 12 are turned and opened using the coupling members 30A and 30B as axes. The main body 2 as an object to be supported is fixed to the attachment part 21 of the bracket 20, and the bracket 20 is fixed to the coupling members 30A and 30B. Therefore, without detaching the stand 3 from the main body 2 as an object to be supported, the front arm 11 and the rear arm 12 are opened/closed. Thus, the volume of the packing box 50 is suppressed, and the installing work is simplified.

Figure 18:
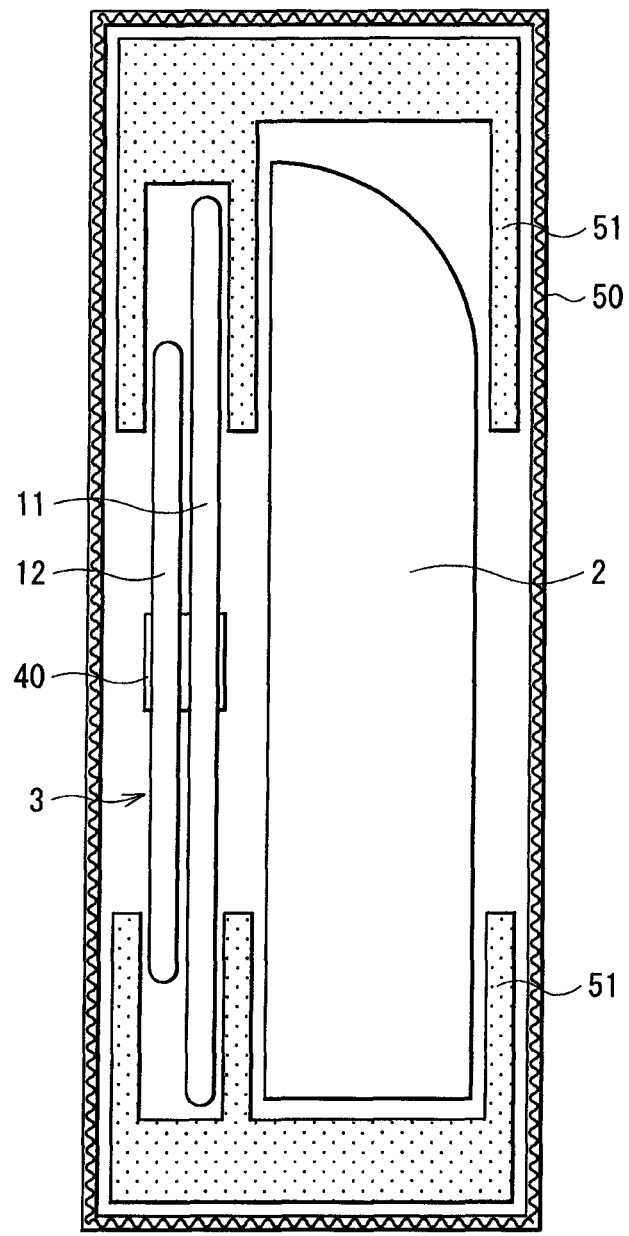
FIG. 18 is a top view illustrating another packing state of the display device.

Although the present invention has been described above by the embodiment, the invention is not limited to the foregoing embodiment but may be variously modified. For example, in the foregoing embodiment, the case where the display device is packed in the packing box 50 in a state where the front arm 11 and the rear arm 12 are closed with the stand 3 remained attached to the main body 2 as illustrated in FIG. 17 has been described above. Obviously, as illustrated in FIG. 18, the display device may be packed in the packing box 50 in a state where the stands 3 are detached from the main body 2. In this case, the display device 1 is assembled with a simple work by the assembling procedure described above with reference to FIGS. 13 to 15.

By attaching an attachment part made of resin (not illustrated) to the top face of the front arm 11 and the rear arm 12 and making the bottom face of the main body 2 come into contact with the attachment part, the weight of the main body 2 may be dispersed onto the front arm 11 and the rear arm 12.

Figure 19:
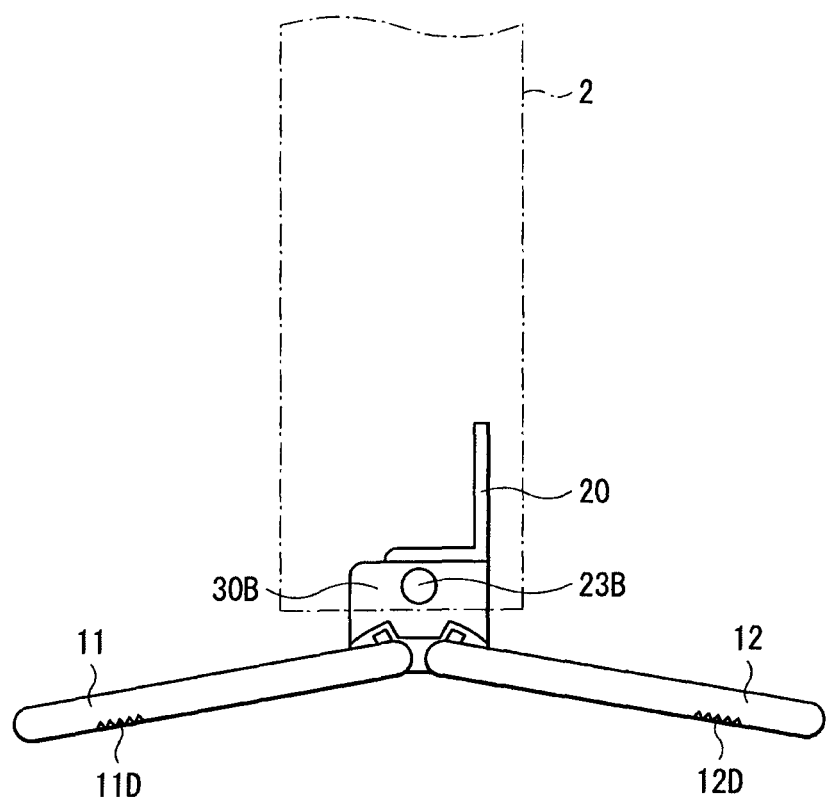
FIG. 19 is a diagram illustrating a modification of the stand.

Further, as illustrated in FIG. 19, nonslip structures 11D and 12D having an uneven shape or made of elastic resin may be provided in proper positions in the under face of the front arm 11 and the rear arm 12. With the configuration, even if the base 10 partly extends outside the desk surface, falling of the display device 1 is suppressed. The nonslip structures 11D and 12D are formed, for example, by press-molding an uneven or waveform shape in the under face of the front arm 11 and the rear arm 12 and adhering an elastic resin.

The present application contains subject matter related to that disclosed in Japanese Priority Patent Application JP 2010-115240 filed in the Japanese Patent Office on May 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a front-face member having a transparent plate, a frame having a joint face joined to a rear face of the transparent plate by a joint layer and a holding face provided upright from the joint face, and a hook projected from the holding face of the frame to the outer periphery side of the transparent plate;
a display panel which is fit in the frame and has a screw hole in its rear face;
a sandwiching member having a pair of clipping faces which come into contact with rear and front faces of the display panel, a side face connecting the pair of sandwiching faces, an opening which is formed in the side face and to which the hook is inserted, and a through hole which is provided in one of the pair of sandwiching faces and is aligned to the screw hole in the display panel; and
a rear-face casing fixed to the rear face of the display panel by a screw using the through hole and the screw hole and covering the entire rear face of the transparent plate.

2. The display device according to claim 1, wherein the sandwiching member has, in its side face, a projection which comes into contact with the inner face of the rear-face casing.

3. The display device according to claim 2, wherein the projection of the sandwiching member is provided in a brim shape at the upper periphery of the opening.

4. The display device according to claim 3, wherein the hook is projected in parallel to the rear face of the transparent plate from the holding face of the frame, and its tip is bent along an extension direction of the frame.

5. The display device according to claim 4, wherein the opening or the side face in the sandwiching member is locked to the hook by inserting the hook in the opening in the sandwiching member, sandwiching the rear and front faces of the display panel by the pair of sandwiching faces, and making the sandwiching member slide in a direction opposite to the bending direction of the hook.

6. The display device according to claim 5, wherein two hooks are provided in each of a plurality of places in the frame, and width of the opening in the sandwiching member is equal to distance between the two hooks.

7. The display device according to claim 6, further comprising a projection piece which is provided between the two hooks and projects from the holding face of the frame to the outer periphery side of the transparent plate,
   wherein when the pair of sandwiching faces come into contact with the rear and front faces of the display panel, the hook and the projection piece overlap the projection.

* * * * *